Figure 1:
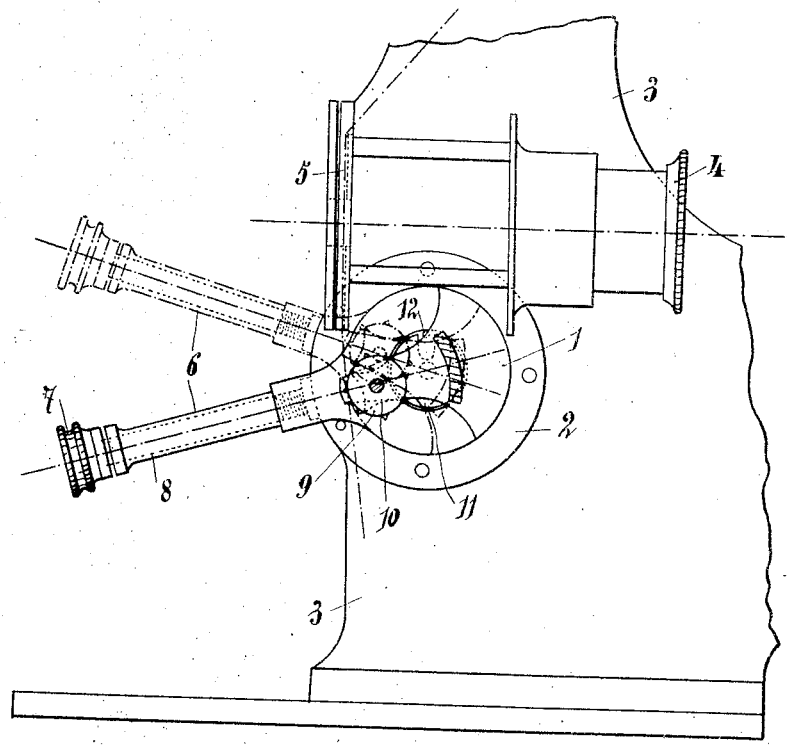

No. 857,069. PATENTED JUNE 18, 1907.
E. A. IVATTS.
ARRANGEMENT FOR THE CENTERING OF THE IMAGES IN KINEMATOGRAPH
PROJECTION APPARATUS.
APPLICATION FILED FEB. 19, 1907.

WITNESSES

INVENTOR

UNITED STATES PATENT OFFICE.

ERNEST ALBERT IVATTS, OF PARIS, FRANCE, ASSIGNOR TO LA COMPAGNIE GENERALE DE PHONOGRAPHES, CINEMATOGRAPHES & APPAREILS DE PRECISION, OF PARIS, FRANCE.

ARRANGEMENT FOR THE CENTERING OF THE IMAGES IN KINEMATOGRAPH PROJECTION APPARATUS

No. 857,969.

Specification of Letters Patent.

Patented June 18, 1907.

Application filed February 19, 1907. Serial No. 358,262.

*To all whom it may concern:*

Be it known that I, ERNEST ALBERT IVATTS, a citizen of the French Republic, residing at Paris, in the department of the Seine and Republic of France, have invented certain new and useful Improvements in an Arrangement for the Centering of the Images in Kinematograph Projection Apparatus, of which the following is a specification.

It is known generally that in order to obtain a perfect projection, it is necessary to fulfil the following conditions imposed by the science of optics, viz:

The luminous point (source of light), the axis of the condenser, the center of the image to be projected, the axis of the objective, and the center of the screen, must always be situated on the same straight line, the axes having to coincide. In practice, and particularly in kinematography, the exactness of these optical laws has to be more or less disregarded, the mechanical arrangement to enable these laws to be exactly observed not having yet been sufficiently perfected.

In all known projecting apparatus it very seldom happens that when the film is drawn in by its perforations engaging with the projections of the winding drum, the center of the images coincides exactly with the center of the aperture, which must be on the straight line passing through the luminous point, the axis of the condenser and the axis of the objective.

Very often the lower part, and the upper part, of two consecutive images are in front of the aperture; in this case, before commencing to unwind the film for the projection, it is necessary to proceed to center the image, which centering consists in bringing the center of the image in front of that of the aperture. It is then necessary to adjust the objective so that the prolongation of its axis passes through the center of the image.

It may happen that the objective being no longer in the optical axis, receives the luminous rays obliquely which produces in the projection a dispersion of the rays which is evidenced by blots of green, red, blue, etc. or by a portion of the projection remaining in obscurity. Other defects of the same kind are produced by an adjustment either of the condenser, the luminous point, or even the whole apparatus together, so that the centering of the image necessary before commencing the exhibition of the film has only hitherto been obtained by trial and adjustment of the parts of the projector apparatus, with respect to the film, which, once placed in the duct and led on to the drum could be regarded as fixed.

The present invention, which is applicable to all known apparatus, removes all the disadvantages above mentioned and permits the exact arrangement of the different parts combining to form a good projection according to the laws of optics above cited. The arrangement which enables this result to be obtained effects the adjustment of the drawing in drum concentrically about a fixed axis, so that the film having been once passed into the duct and fed on to the drum the latter may be adjusted in position, effecting the adjustment of the film, until one of the images is square with the aperture and its center is on the same optical line as that of the aperture. Once this is effected the drum is locked thus preventing any displacement of the film and consequently the decentering of the image, and the operation of exhibiting the film may take place.

The drawings annexed to the present description show this centering arrangement.

Figure 2:
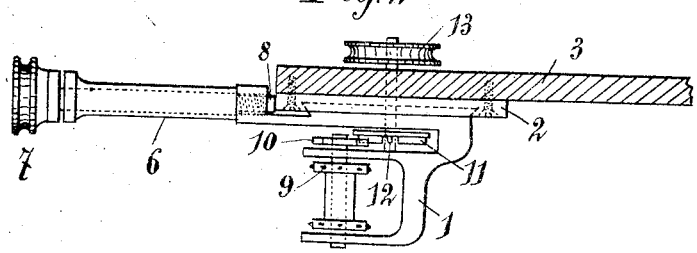

Figure 1 is a side view showing the arrangement fitted under the objective and the duct of the projector apparatus. Fig. 2 is a top view of the same arrangement, the objective and the duct being removed in order to show the different parts and their respective positions.

Fixed to the frame below the objective and the duct into which the film passes, is a ring of copper which supports, while allowing it to turn about its axis, the plate of a double stirrup or bearing. This stirrup 1, of a special shape and made of cast iron, copper, or other metal is composed of a plate in the shape of a truncated cone held lightly by the copper ring 2 in such manner that the possible play may be taken up by tightening, by means of a screw, the ring 2 against the frame 3 of the apparatus supporting the objective 4 and the duct 5.

In the projecting part of the plate forming the double stirrup, are fitted the drawing in mechanism and the drum.

To enable the stirrup to be turned in the ring the part of the plate opposite the double bearing widens out in the form of a dove-tail and is terminated by a lever 6 provided with a set screw 7 the pin 8 of which rubs on the side of the ring 2, thus permitting the stirrup to be firmly clamped when the image is once centered.

The movement of the drum 9 is effected by means of a Maltese cross 10 keyed on its axis and which works round an actuating plate 11 provided with a pin 12. The axis of the actuating plate is in line with the axis of rotation of the stirrup 1, while the axis of the drum which is parallel to it is situated at a certain distance therefrom.

The actuating plate 11 as also the Maltese cross 10 are fitted in the first bridge formed by the projecting part of the stirrup 1, the drum being in the second bridge the arms of which form bearings to support the axes of the drum 9 and of the Maltese cross 10, and may if required be provided with small lubricating holes or cups. It will be seen that by this arrangement the drum 9 can be adjusted concentrically about the axis of the actuating plate 11 by simply rotating the stirrup 1 in the ring 2, by means of the lever 6.

Whatever may be the position of the drum 9 around the axis of the actuating plate 11 its rotation is always insured by the Maltese cross 10 constantly resting in contact with the actuating plate 11 so that the pin 12 at each turn moves the Maltese cross forward by a quarter of a turn, which corresponds to the change of an image of the film in front of the aperture.

The movement of the actuating roller 11 is obtained by means of a pulley 13 or by any other suitable part, mounted on the prolongation of the axis of the plate and outside the case.

The operation of the apparatus is as follows: After having introduced the end of the film into the duct 5 and fed it on to the drum 9, and supposing that (the arrangement occupying the position shown dotted in Fig. 1) the center of any one of the images of the film is above the center of the aperture situated in the optical line, the image has to be lowered until its center comes opposite the center of the aperture on the optical line. To do this it is sufficient, after having unscrewed the clamping screw 7, to lower the lever 6 until it attains the proper position, such as that shown by full lines on Fig. 1. The displacement of the lever 6 carrying with it the drum 9, effects the displacement of the film in the duct, a displacement which corresponds exactly with the distance necessary to bring the center of the image in front of the center of the aperture. With this arrangement it is no longer necessary to have large apertures, an aperture having the same dimension as the image of the film is sufficient.

Having now particularly described and ascertained the nature of my said invention and in what manner the same is to be performed, I declare that what I claim is:

1. In a kinematograph, the combination with the objective and the driving shaft, of a plate rotatable concentric with said shaft, a stirrup on said plate, a film-feeding drum journaled in said stirrup, and inter-meshing gears on the shaft and on the drum.

2. In a kinematograph, the combination with the objective and the driving shaft, of a circular plate rotatable concentric with said shaft, a film-feeding drum mounted on said plate and geared to said shaft, a ring concentric with said plate, and a locking device carried by said plate and engaging with said ring.

3. In a kinematograph, the combination with the objective and the driving shaft, of a circular plate concentric with said shaft and having a beveled edge, a film-feeding drum mounted on said plate and geared to said shaft, a stationary ring engaging with the beveled edge of said plate, an arm on said plate, and a set screw carried by said arm and engaging with the edge of said ring.

In testimony whereof I affix my signature in presence of two witnesses.

ERNEST ALBERT IVATTS.

Witnesses:
HENRY DANZER,
LUCIAN CRESPIN.